Patented July 3, 1934

UNITED STATES PATENT OFFICE 1,964,723

PRODUCTION OF ALKALI METAL CARBAMATES

George Lewis Cunningham, Robert Burns Mac-Mullin, and Wesley King McCready, Niagara Falls, N. Y., assignors to The Mathieson Alkali Works, Inc., New York, N. Y., a corporation of Virginia No Drawing. Application March 31, 1932, Serial No. 602,398. Renewed September 30, 1933

5 Claims. (Cl. 260—112)

This invention relates to improvements in the production of alkali-metal carbamates from alkali-metal bicarbonates. In brief, in carrying out the invention for the production of sodium carbamate for example, sodium bicarbonate is subjected to treatment with anhydrous ammonia or with an aqueous solution of ammonia containing from 35-50% to 100%, as a limit, $NH_3$. Concentrations of about 75-90% $NH_3$ are particularly advantageous. The reaction proceeds as follows:

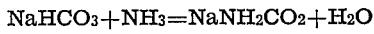
$$NaHCO_3 + NH_3 = NaNH_2CO_2 + H_2O$$

If the concentration of the aqueous ammonia solution is too low, sodium sesquicarbonate will form instead of sodium carbamate. This lower limit approximates 35% $NH_3$. Other ammonia-containing salts are also formed, in some cases, with $NH_3$ concentrations just above 35%. With anhydrous ammonia or with the higher concentrations of aqueous ammonia, the reaction proceeds but very slowly. The invention is applicable with particular advantage to crude ammonia soda. When the concentration of the aqueous ammonia solution becomes too low, its remaining ammonia content may be recovered by distillation. Temperature control is not essential. The reaction proceeds at temperatures as low as $-34°$ C. although it proceeds more rapidly at higher temperatures. At higher temperatures, however, the reaction must be carried out under superatmospheric pressure to maintain the concentration of the aqueous ammonia solution. By using the other alkali-metal bicarbonates, potassium bicarbonate for example, the corresponding alkali-metal carbamates, potassium carbamate for example, may be produced.

We claim:

1. In the conversion of alkali-metal bicarbonates to carbamates, the improvement which comprises subjecting the bicarbonate to treatment with an aqueous solution of ammonia containing about 35-100% $NH_3$.

2. In the conversion of crude ammonia soda to sodium carbamate, the improvement which comprises subjecting the crude ammonia soda to treatment with an aqueous solution of ammonia containing about 35-100% $NH_3$.

3. In the conversion of crude ammonia soda to sodium carbamate, the improvement which comprises subjecting the crude ammonia soda to treatment with an aqueous solution of ammonia containing about 50-100% $NH_3$.

4. In the conversion of crude ammonia soda to sodium carbamate, the improvement which comprises subjecting the crude ammonia soda to treatment with an aqueous solution of ammonia containing about 75-90% $NH_3$.

5. In the conversion of crude ammonia soda to sodium carbamate, the improvement which comprises subjecting the crude ammonia soda to treatment with anhydrous ammonia.

GEORGE LEWIS CUNNINGHAM.
ROBERT BURNS MacMULLIN.
WESLEY KING McCREADY.